United States Patent [19]

Sakai et al.

[11] Patent Number: 5,020,903
[45] Date of Patent: Jun. 4, 1991

[54] OPTICAL CORRELATION-TYPE VELOCITY MEASUREMENT APPARATUS

[75] Inventors: Satoshi Sakai; Kazuteru Maekawa, both of Anjo, Japan

[73] Assignee: Aisin AW Co., Ltd., Anjo, Japan

[21] Appl. No.: 290,341

[22] Filed: Dec. 27, 1988

[30] Foreign Application Priority Data

Dec. 28, 1987 [JP] Japan .................. 62-333042
Dec. 28, 1987 [JP] Japan .................. 62-333043
Dec. 28, 1987 [JP] Japan .................. 62-333044

[51] Int. Cl.⁵ ............................................. G01P 3/36
[52] U.S. Cl. .................................. 356/28; 180/169
[58] Field of Search ............. 356/28.5; 73/861.05, 73/861.06; 250/573; 180/169; 324/161

[56] References Cited

U.S. PATENT DOCUMENTS

| | | | |
|---|---|---|---|
| 2,967,449 | 1/1961 | Weiss | 356/28 |
| 3,525,568 | 8/1970 | Dreyfus | 356/28 |
| 3,960,410 | 6/1976 | Leitz et al. | 356/28 X |
| 4,162,509 | 7/1979 | Robertson | 356/28 |
| 4,167,330 | 11/1979 | Haville | 356/28 |
| 4,201,467 | 5/1980 | Hartmann et al. | 356/28 |
| 4,329,047 | 5/1982 | Kikuchi et al. | 356/28 |
| 4,516,861 | 5/1985 | Parker et al. | 356/28 |
| 4,696,567 | 9/1987 | Ruger et al. | 356/28 |
| 4,733,962 | 3/1988 | Brendemuehl | 356/28 |

Primary Examiner—Thomas H. Tarcza
Assistant Examiner—Linda J. Wallace
Attorney, Agent, or Firm—Varndell Legal Group

[57] ABSTRACT

In a correlation-type speedometer which determines velocity by calculating stagger time from a maximum value of the correlation function of outputs from two sensors arranged one in front of the other in the direction of movement, use is made of an oblong slit, a sensor whose light-receiving surface has an oblong shape, a diaphragm having an oblong aperture, or lens that is cut leaving an oblong area through which light can pass. The result is formation of a measurement spot having an oblong shape that is narrow in a forward direction of movement and long in a direction at right angles to the forward direction. In another aspect, two sets of light sources and sensors are arranged so that their relative positional relationships are the same, the light sources are made to flash at different periods and the periodicity of the flashing light sources is utilized to eliminate the influence of light entering the sensor of one set from the light source of the other set. In a further apsect, a velocity is sensed from the stagger time from which the correlation function is maximized, and the reflection factor of a road surface is detected from the difference between sensor output when a light source is turned on and off.

12 Claims, 18 Drawing Sheets (4WD)

(ABS)

OPTICAL CORRELATION-TYPE VELOCITY MEASUREMENT APPARATUS

BACKGROUND OF THE INVENTION

This invention relates to an optical correlation-type velocity measurement apparatus and, particularly an apparatus which makes it possible to prevent a change in the size and shape of light-receiving spots, a change in the measurement spot spacing of front and rear sensors, etc. The present invention also makes it possible and to shorten the distance between the sensors and further enables the frictional coefficient of a road surface to be measured at the same time as velocity measurement.

In general, a correlation-type speedometer is used to detect velocity, such as flow velocity and vehicle velocity.

The principle of a correlation-type speedometer used conventionally will be described with reference to FIG. 1.

For example, as shown in FIG. 1, optical sensors 1 and 3 are provided on a vehicle body 5 with a spacing 1 therebetween in the direction of travel indicated by the arrow, and the respective output waveforms of the sensors obtained by sensing light reflected from a measured surface 7 (i.e., the surface of a road) are sampled at a period $\Delta t$. If the series of sampled values so obtained is represented by $x_p$, $y_p$ ($p=0, 1, 2, \ldots N-1$), respectively, a cross correlation function $r_{xy}(k)$ of these two waveforms will be expressed as follows:

$$r_{xy}(k) = \frac{1}{N} \sum_{p=0}^{N-1} x_p \cdot y_{p+k}$$

If $r_{xy}(k_m)$ represents the maximum value of $r_{xy}(k)$, then the stagger time between the two waveforms will be $\Delta t \cdot k_m$. Accordingly, the travelling velocity V will be expressed as follows:

$$V = l/_{66} t \cdot k_m$$

In almost all cases the shape of the field of view of the sensors used in a correlation-type speedometer is circular, and shapes other than this are not particularly stipulated. However, it is known that the smaller the width of the field of view in the forward direction, the higher the frequency component of the signal obtained at the same velocity. In order to achieve an accurate measurement of velocity, it is necessary to sample a minimum of several periods of the signal. The higher the signal frequency, the more sampling time can be shortened. In order to shorten sampling time by means of a such a characteristic, the sensor field of view should be reduced. If this is done when the field of view is circular, however, there is a higher probability that the fields of view of the two sensors will traverse different areas, thereby inviting a decline in correlativity and diminishing measurement precision. Furthermore, by reducing the area of the field of view, there is greater susceptibility to the effects of external disturbances as caused by the motion of snow flakes or water droplets which come between the sensors and the object being measured. This is a fatal flaw in an ABS (anti-skid braking system) which is designed to be effective for snow-covered and wet roads.

FIG. 2 illustrates a speedometer using a conventional spatial filter-type detection system. The arrangement includes sensors 11, 13, a focal plane 15, a slit or pin-hole 17 and a lens principal plane 19. Numeral 21 denotes a road surface, and numerals 23, 25 designate spot optical paths.

If the device shown in FIG. 2 is arranged so that the lens focal points are placed at the position of the slit or pin-hole 17, as shown in FIG. 2, only the parallel light incident upon the lenses will will pass through the slit or pin-hole to be detected. Sensor 11 senses only the parallel light along optical path 25, and sensor 13 senses only the parallel light along optical path 23. Accordingly, spot width w will not change even if the distance between the road surface and the lenses varies. When the outputs of sensors 11, 13 are combined, a change in reflected light caused by sensor pitch width and irregularities in the same road surface is emphasized, while a change in reflected light due to other irregularities is random with respect to the sensors 11, 13 and therefore is cancelled out. As a result, velocity can be detected from the extracted output frequency.

In a case where sensors are mounted on an automotive vehicle and a correlation function is computed to determine velocity relative to a road surface, there is a change in the shape and size of the light-receiving spots of the front and rear sensors when the measurement distance varies due to bouncing of the vehicle body or unevenness in the road surface. Since this change in spot shape and size means that the front and rear sensors will not scan the same points on the road, agreement between the sensor output waveforms diminishes and correlativity declines. When the measurement distance fluctuates, moreover, the distance between the spots essentially varies, leading to the problem of measurement error. In this regard, the size and shape of the sensor spot will not change if sensors arranged as shown in FIG. 2 are applied to a correlating-type speedometer. However, since only parallel light that passes through the focal point is received, a problem is that the amount of light is small, with a low S/N ratio resulting. In order to raise the S/N ratio, a high-output light source is required, which in turn leads to problems relating to power consumption, size and service life.

Furthermore, if the surface under measurement is a scattering reflective surface, measurement is possible with the conventional correlation-type speedometer but this will not be the case if the reflecting surface is mirror-like, as can happen if the surface is covered with water droplets or a water film. This point will now be described in connection with FIGS. 3 and 4.

In a case where reflected light originating from the same light source 41 is received by sensors 42, 43 provided on a vehicle body 40 one in front of the other in the direction of travel, as shown in FIG. 3, assume that incident light 45 impinges at an angle $\alpha$ at a point A on a water surface 44, and that light 46 reflected from the water surface at the angle $\alpha$ is sensed by the sensor 42.

Next, assume that the vehicle travels the distance l between the sensors and that $\beta$ is now the angle of incidence of light 47 received at point A from the light source 41. In such a case reflected light 48 from point A cannot be sensed by the sensor 43.

When a scattering reflective surface is involved, light is reflected in all directions even if the angle of incidence differs somewhat, and this makes it possible for the sensors 42, 43 to receive light reflected from the same point despite a difference in the angle of incidence. With a mirror-like surface, however, light is reflected only in a direction where the reflective angle is equal to the angle of incidence, so that light received from the same light source by one sensor will not be received by the other. As a result, the correlativity of the two sensor output waveforms diminishes and measurement may become impossible in a worst-case scenario.

In an attempt to solve this problem, a set-up of the kind shown in FIG. 4 may be adopted, in which light sources 51, 52 are provided for respective sensors 53, 54 and these elements are arranged in such a manner that the relative positional relationship between light source 51 and sensor 53 is exactly the same as that between light source 52 and sensor 54. With this arrangement, light reflected from the same point can be sensed even if the surface under measurement is a mirror surface.

However it is necessary that the set-up depicted in FIG. 4 be arranged so that each sensor does not pick up reflected light originating from the other sensor's light source. This means that the distance between the two sensors cannot be made very short and, thus sampling time is prolonged. If distance between the sensors is enlarged, the fields of view of the front and rear sensors pass along different locations, as when the vehicle rolls relative to the direction of travel, as a result of which waveform correlativity declines.

In addition, 2-wheel/4-wheel drive changeover, center differential locking control and braking control are performed upon comparing engine driving force and the force acting upon the vehicle wheels. In calculating the force acting upon the wheels in such case, the condition of the road surface is ascertained, and the coefficient of friction is determined, based on the light reflected from the road surface. However, where vehicle drive control and braking control are carried out by measuring actual velocity and the coefficient of friction of the road surface simultaneously, it is required that identical optical sensors be separately provided for sensing velocity and for measuring the coefficient of friction, and that a system be provided for processing each of the sensor output signals. This arrangement would involve a great deal of waste and pose problems in terms of sensor installation space and cost.

SUMMARY OF THE INVENTION

The present invention has been devised in order to solve the foregoing problems.

Accordingly, an object of the present invention is to reduce the influence of transverse displacement of the front and rear sensors, as well as the influence of outside disturbances.

Another object of the present invention is to improve measurement accuracy by obtaining a signal having higher frequency components even at the same velocity.

Still another object of the present invention is to prevent any change in the shape and size of front and rear measurement spots even if measurement distance changes.

Yet another object of the present invention is to increase the amount of received light to make possible a higher S/N ratio even with a small size light source.

A further object of the present invention is to shorten the distance between sensors, thereby shortening the time needed for velocity calculation processing and reducing the size of the apparatus.

A further object of the present invention is to arrange it so that the distance between measurement spots will not change even if measurement distance changes.

A further object of the present invention is to reduce sensor spacing and make possible velocity measurement without a decline in the correlativity of the front-and-rear sensor output waveforms, even when the measured surface is a mirror-like surface.

A further object of the present invention is to arrange it so that measurement of coefficient of friction and detection of velocity are performed with a compact, low-cost apparatus by using the same sensors and signal processing system for both velocity detection and measurement of coefficient of friction.

According to the present invention, the foregoing objects are attained by providing an optical correlation-type velocity measurement apparatus for calculating velocity by computing a correlation function of detection output signals from two sensors arranged one in front of the other in a direction of travel, and determining a stagger time that maximizes a correlation function value, characterized by forming a sensor detection field of view, namely a measurement spot, which is narrow in the forward direction of travel and long in a direction at right angles to the forward direction. To this end, use is made of an oblong slit, a sensor having an oblong shape, a diaphragm having an oblong aperture and employed in combination with a sensor having an oblong shape, or a lens that is cut leaving an oblong area through which light can pass. In a case where the cut lens is used, two sensors are formed on the same substrate or chip and two lenses are formed as a whole. In another aspect of the invention, the optical correlation-type velocity measurement apparatus is characterized in that two sets of light sources and sensors are arranged in such a manner that the two sets have relative positional relationships with respect to a measured surface that are the same, the two light sources are caused to flash at periods that differ from each other, and the influence of light entering the sensor of one set from the light source of the other set is eliminated by utilizing the periodicity of the flashing light sources. Further, by turning on and off the light sources irradiating the road surface, velocity is determined from the stagger time that maximizes the correlation function value, and the coefficient of friction of the road surface is determined from the difference between sensor outputs when the light sources are turned on and off.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the invention will now be described in detail with reference to the drawings.

Figure 1:
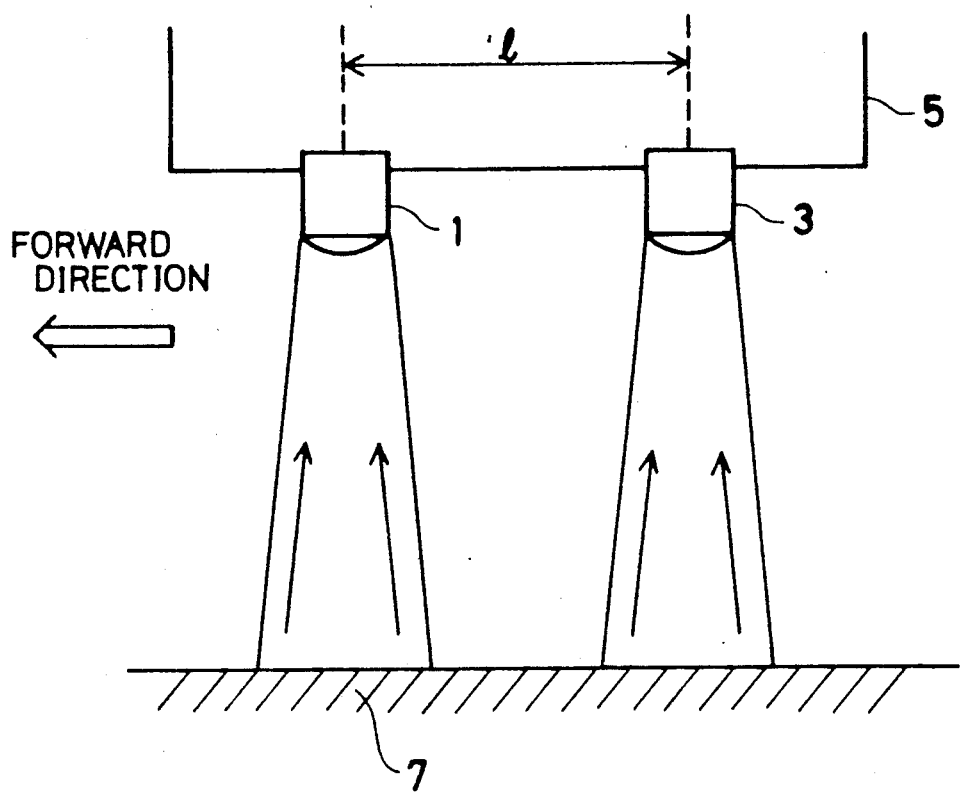
FIG. 1 is a view useful in describing the principle of a correlation-type speedometer.
Figure 2:
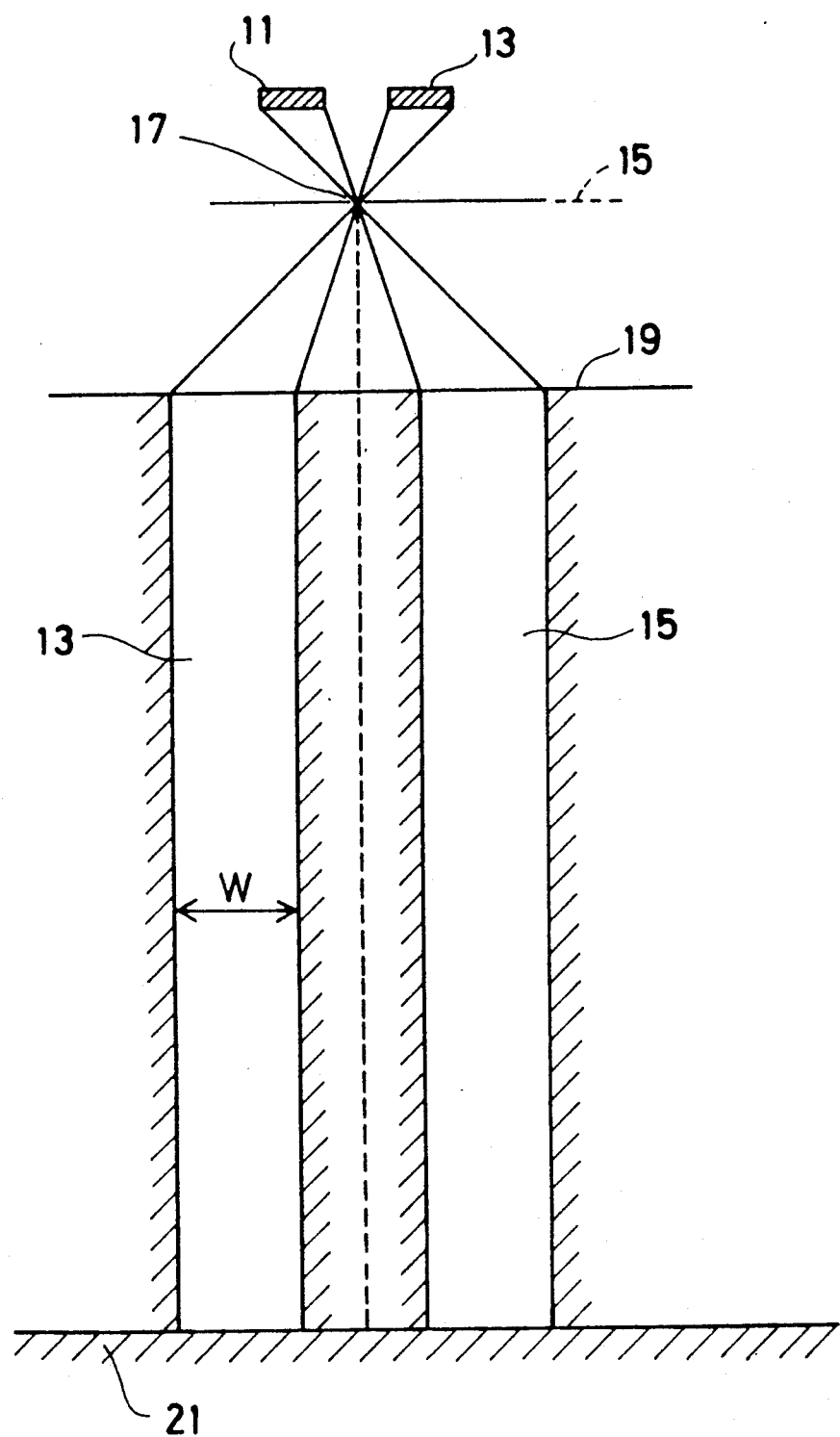
FIG. 2 is a view illustrating a conventional speedometer.
Figure 3:
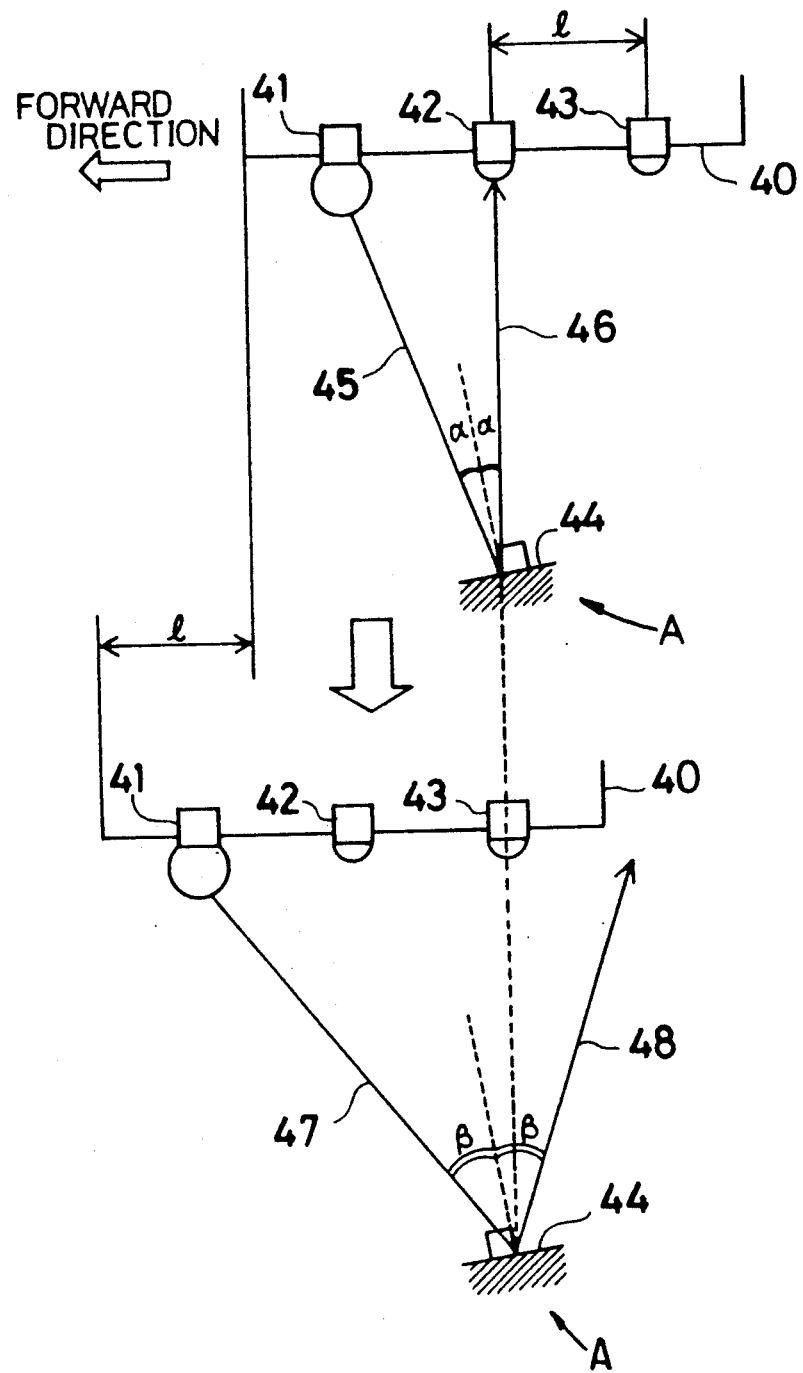
FIGS. 3 and 4 are views for describing an optical correlation-type speedometer according to the prior art.
Figure 4:
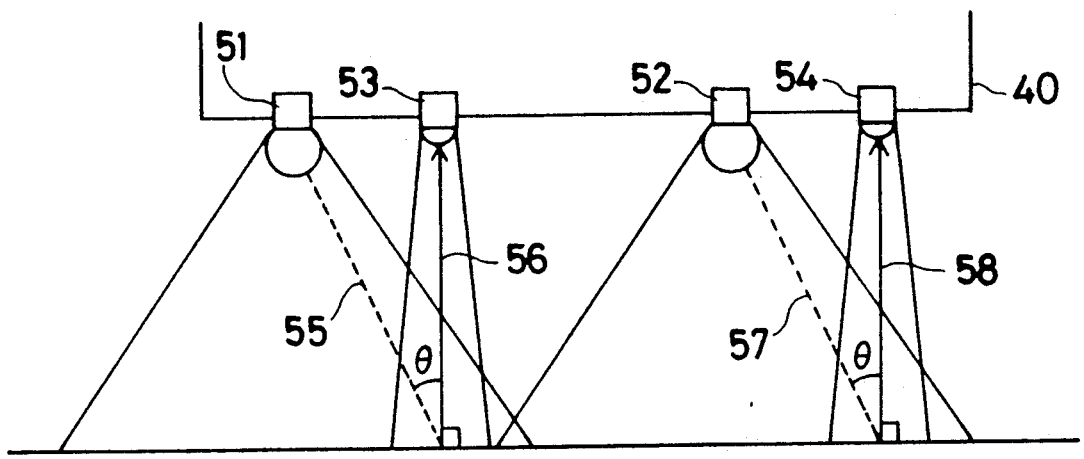
Figure 5:
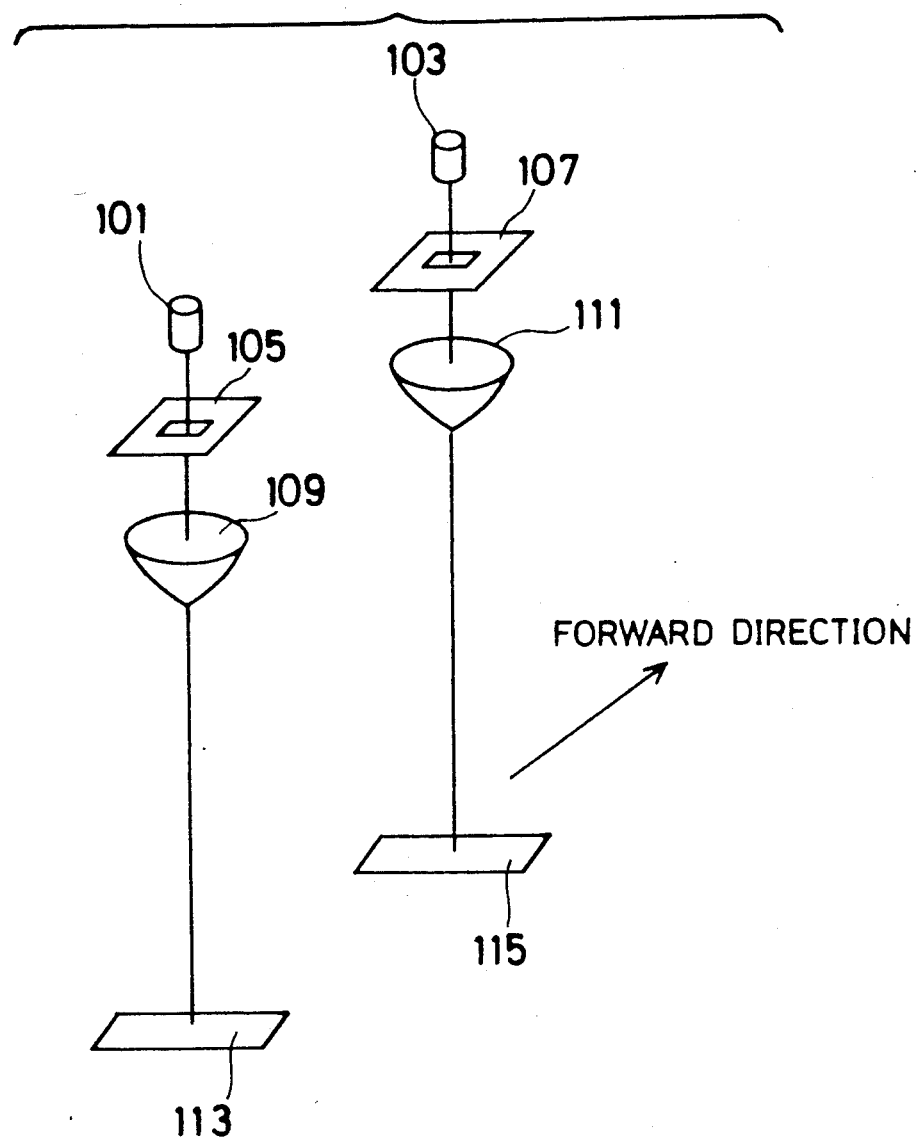
FIG. 5 is a view illustrating an embodiment of a correlation-type speedometer using oblong slits in accordance with the invention.

FIG. 5 is a view showing the arrangement of a correlation-type speedometer using oblong slits in accordance with an embodiment of the invention. The arrangement includes sensors 101, 103, slits 105, 107, and lenses 109, 111. Numerals 113, 115 denote spots on a road surface.

In this embodiment, the slits 105, 107 are rectangular in shape to form the oblong spots 113, 115 on the road surface, thereby obtaining fields of view that are oblong in shape. Sensor outputs for a case where a field of view is formed to have such an oblong shape will now be described with reference to FIGS. 6, 7 and 8.

Figure 6A:
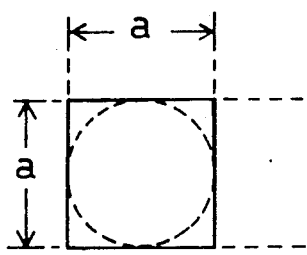
FIGS. 6(a) to 6(c) are views illustrating slit shape.
Figure 6B:
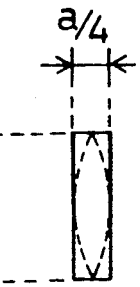
Figure 6C:
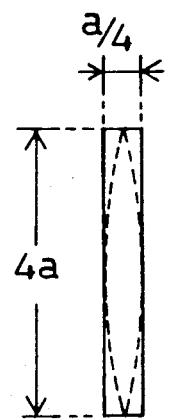

FIG. 6(a) shows a spot having a square shape, 6(b) a rectangular spot in a case where width in the forward direction is made ¼ of that in FIG. 6(a), and 6(c) a spot in accordance with the present invention, in which width in the forward direction is made ¼ of that in FIG. 6(a) and length in the direction at right angles to the forward direction is made four times the width.

Spot area in FIG. 6(a) is $a^2$, $a^2/4$ in FIG. 6(b) and $a^2$ in FIG. 6(c). Accordingly, since width in the forward direction is reduced by adopting the slit shape of FIG. 6(c), the detection signal contains many high-frequency components, while the spot area is as large as that in FIG. 6(a). The sensor using this arrangement is less susceptible to the effects of external disturbances caused by the motion of snowflakes, water droplets and the like.

Figure 7A:
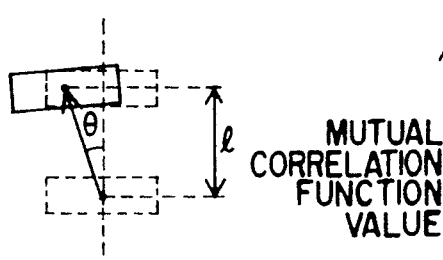
FIGS. 7(a) to 7(b) are views showing a change in correlation function value when front and rear sensors undergo transverse displacement.

When sensors spaced apart by a distance l undergo transverse displacement or if they are displaced transversely relative to each other by an angle $\theta$ due to a change in steering angle, as shown in FIG. 7(a), correlativity suffers if the amount of displacement between the front and rear sensors is too large. Conversely, correlativity is improved if the amount of displacement between the front and rear sensors is reduced. Assuming the same angle of displacement in the transverse direction, the ratio of the area of the road surface not overlapped by the spots of the front and rear sensors is ¼ for FIG. 6(c), since the length in the width direction is four times larger in FIG. 6(c), in comparison with FIGS. 6(a), (b).

Figure 7B:
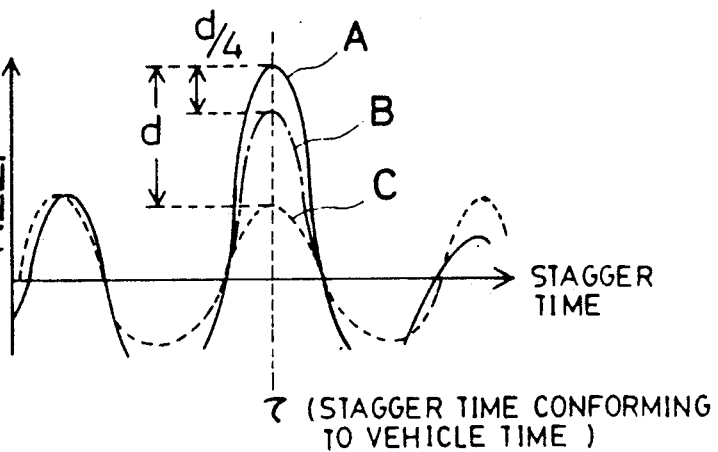

FIG. 7(b) illustrates the change in correlation function when the front and rear sensors develop transverse displacement. Curve A indicates the correlation function when there is no transverse displacement, and curves B, C indicate the characteristics when transverse displacement occurs. In the absence of transverse displacement, the characteristic A holds for cases (a), (b) and (c) of FIG. 6. When transverse displacement occurs, correlativity declines and the maximum correlation value decreases. However, assuming that the maximum value decreases by d in the cases of FIGS. 6(a), (b) (characteristic C), the ratio of decrease is only d/4 in the case of FIG. 6(c), as shown by characteristic B.

Figure 8:
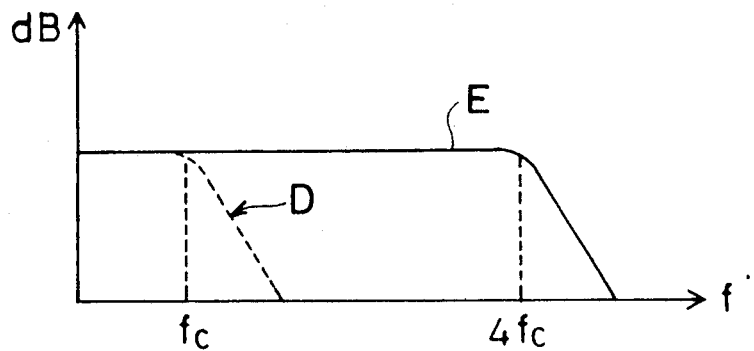
FIG. 8 is a view showing the relationship between spot shape and sensor output signal frequency component.

Further, as indicated by characteristic D in FIG. 8, no high frequency components are obtained with the spot of FIG. 6(a), whereas band width increases four-fold on the high-frequency side with the spot shapes of FIGS. 6(b) and (c), as indicated by the characteristic E of FIG. 8. It will thus be understood that high-frequency components are obtained.

In the above embodiment, the slit shape is described as being rectangular. However, the same effects can be obtained with a slit having an elliptical shape, the major axis of which lies at right angles to the forward direction, as shown by the broken line in FIG. 6(c).

Figure 9:
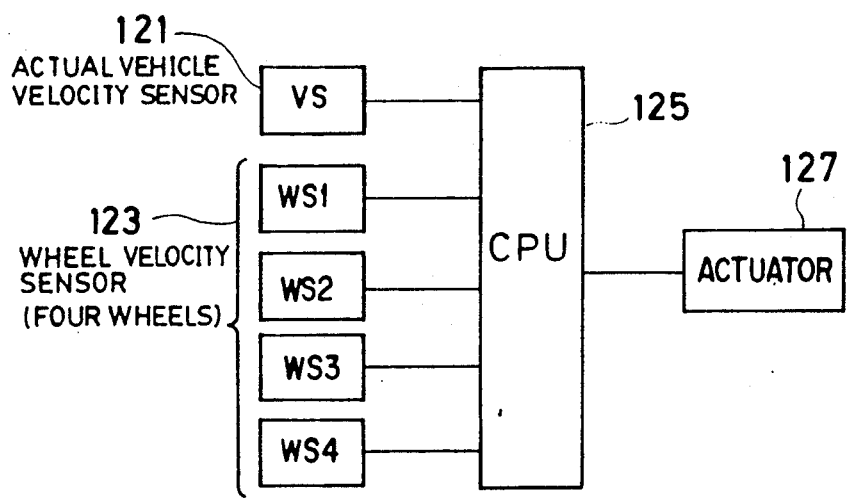
FIG. 9 is a control block diagram for a case where a sensor according to the invention is used as an actual vehicle velocity sensor.
Figure 10:
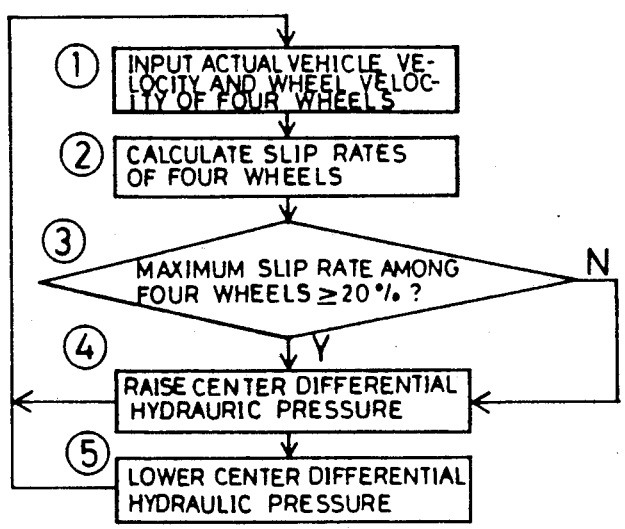
FIGS. 10 and 11 are flowcharts of control.
Figure 11:
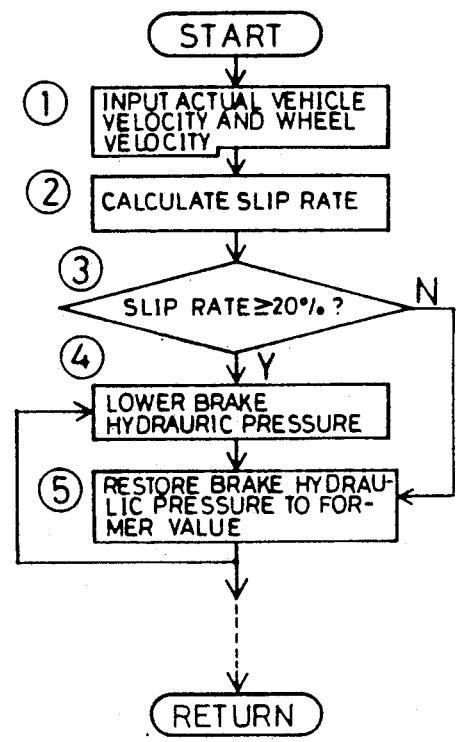

FIG. 9 is a block diagram illustrating an embodiment for a case where the sensor of the invention is employed to sense the actual velocity of a vehicle, and FIGS. 10 and 11 are flowcharts of control associated with this sensor. In FIG. 9, numeral 121 denotes an actual vehicle velocity sensor (VS), 123 wheel velocity sensors for four wheels (WS1, WS2, WS3, WS4), 125 a CPU, and 127 an actuator for control.

More specifically, with reference to FIG. 9, the control actuator 127 is for controlling a 4-wheel drive center differential or ABS brake hydraulic pressure. The CPU 125 compares an output signal from the vehicle velocity sensor 121 and output signals from the wheel velocity sensors 123, detects slip rate from the difference between the two output signals and controls the control actuator accordingly.

FIG. 10 is a processing flowchart for 4-wheel drive center differential control. Step (1) of the flowchart calls for the actual velocity of the vehicle and the wheel velocity of each of the four wheels to be read into the CPU 125, and step (2) calls for the slip rate to be computed based on a comparison between the actual vehicle velocity and each wheel velocity. When the slip rate has been computed, it is determined at step (3) whether the maximum slip rate among the four wheels is equal to or greater than, for example, 20%. If the answer at step (3) is YES, then the center differential hydraulic pressure is raised at step (4) to lock the front and rear wheels, after which the program returns to step (1) to repeat the above control until the maximum slip rate falls below 20%. If the maximum slip rate is found to be less than 20% at step (3), then the center differential hydraulic pressure is lowered at step (5). Thus, control is so executed that phenomena such as a tight-cornering braking will not occur.

FIG. 11 is a processing flowchart for ABS brake hydraulic pressure control. Step (1) of the flowchart calls for the actual velocity of the vehicle and the wheel velocity of each of the four wheels to be read into the CPU 125, and step (2) calls for the slip rate for each wheel to be computed based on a comparison between the actual vehicle velocity and each wheel velocity. When the slip rate has been computed, it is determined at step (3) whether the slip rate is equal to or greater than, for example, 20%. If the answer at step (3) is YES, then brake hydraulic pressure is lowered at step (4). If the maximum slip rate among the four wheels is found to be less than 20% at step (3), the brake hydraulic pressure is restored to its former value at step (5). The processing of steps (3) through (5) is performed in similar fashion for each of the remaining three wheels. Stability at the time of control can be enhanced by thus controlling the brake hydraulic pressure of each of the four wheels.

Thus, by employing an oblong slit as set forth above, the spot on the road surface is formed into an oblong shape which is narrow in the forward direction of travel and long in a direction at right angles to the forward direction. As a result, a decline in correlativity can be prevented even if the front and rear sensors develop transverse displacement, and spot area can be enlarged without the sensor being susceptible to external disturbances. In addition, a signal containing many high-frequency components can be obtained to make high accuracy possible. This also makes it possible to greatly shorten the sampling time needed to achieve the same accuracy.

Figure 12:
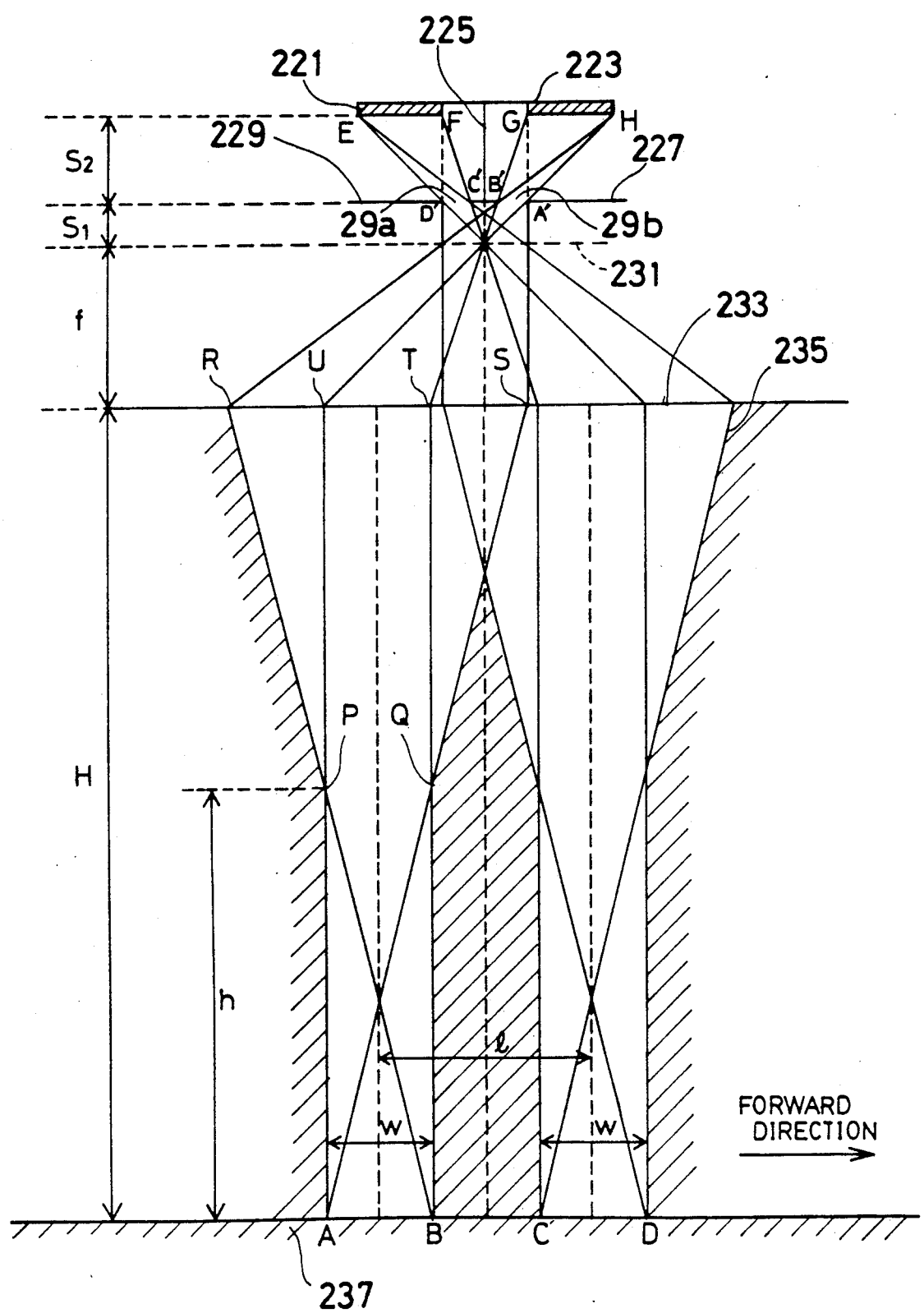
FIG. 12 is a view illustrating another embodiment of a correlation-type speedometer using optical sensors in accordance with the invention.

FIG. 12 is a view showing another embodiment of an optical correlation speedometer using optical sensors. Numerals 221, 223 denote sensors, 225 a partitioning plate, 227 a road surface imaging plane, 229 a slit, 229a, 229b slit apertures, 231 a focal plane, 233 a lens, 235 the principal plane of the lens, and 237 a road surface.

As shown in FIG. 12, the lens 233 has a focal length f and is disposed at a height H above the road surface 237. The slit 229 is placed at the position of the road surface imaging plane 227, which is located a distance S1 rearwardly of the focal plane 229. The sensors 221, 223 are disposed a distance S2 rearwardly of the focal plane 227. AB and CD indicate light-receiving spots on the road surface. The image of light-receiving spot AB is A'B', and the image of light-receiving spot CD is C'D'. These are sensed by the sensors 223, 221, respectively. The partitioning plate 225 is disposed between the sensors to prevent sensor 221 from receiving light from image A'B' and sensor 223 from receiving light from image C'D'.

With regard to sensor 223, let S represent the point at which a line connecting one end G of sensor 223 and one end A' of slit aperture 229b intersects the principal plane 235 of the lens 233, and let R represent the point at which a line connecting the other end H of sensor 223 and the other end B' of slit aperture 229b intersects the principal plane 235 of the lens. Further, let P represent the point at which a straight line AU, which represents one edge of the parallel light path detectable by the sensor 223, intersects a straight line BR. Similarly, let Q represent the point at which a straight line BT, which represents the other edge of the parallel light path detectable by the sensor 223, intersects a straight line BT.

Since the slit 229 lies in the imaging plane of the road surface 237, the light-receiving region detectable on the road surface 237 is AB, and RS in the principal plane 235 of the lens 233 indicates the region detectable by the sensor 223. All of the light incident upon the region RS from the light-receiving spot AB is detectable by the sensor 223. Letting h represent the distance corresponding to PA and QB, it will be understood that the shape of the light-receiving spot will not change in this region even if the distance between the road surface and the sensors varies. Next, the slit aperture diameter, sensor length and sensor position that will satisfy the above requirement will be calculated.

Letting H represent the height of AU, we have $$\frac{1}{H} + \frac{1}{f + S_1} = \frac{1}{f}$$

A magnification m is determined from this equation as follows:

$$m = \frac{f + S_1}{H} = \frac{f}{H - f}$$

Accordingly, we may write $$A'B' = C'D' = \frac{fw}{H - f}$$

$$B'C' = \frac{f(l - w)}{H - f}$$

Further, S1 is obtained as follows:

$$S1 = \frac{f^2}{H - f}$$

Similarly, with regard to the sensors, we have $$EF = GH = \frac{fw}{H - h - f}$$

$$FG = \frac{f(l - w)}{H - h - f}$$

$$S2 = \frac{f^2 h}{(H - f)(H - h - f)}$$

It will suffice to place the partitioning plate 225 between FG and B'G'.

When spot width w on the road surface is thus decided, the dimensions of the lens, slit and sensors and the positions at which they are placed can be determined.

Figure 13A:
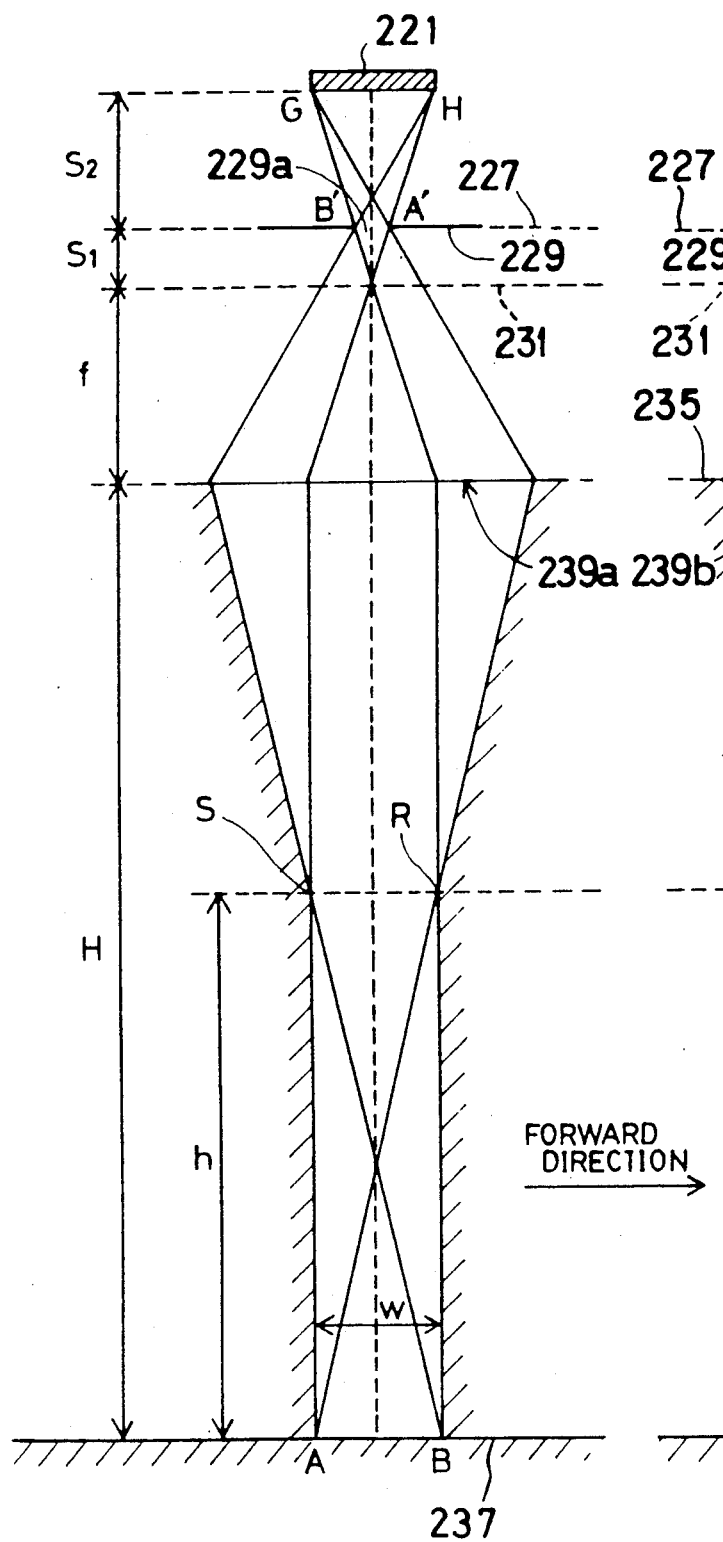
FIGS. 13a and 13b show another embodiment of the invention.
Figure 13B:
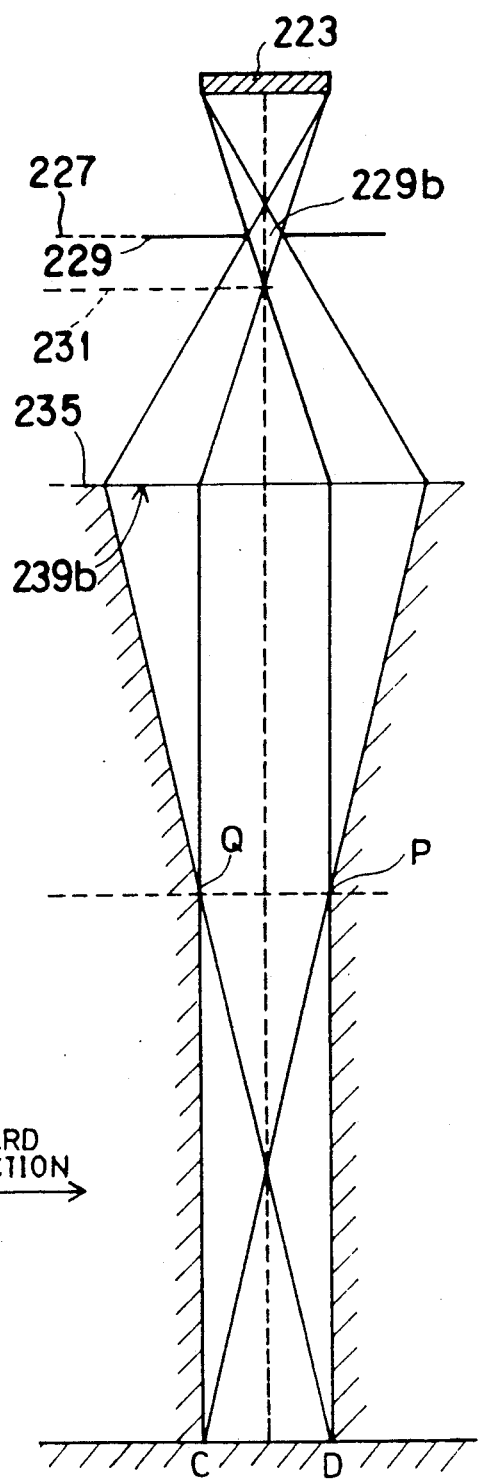

FIGS. 13a and 13b are views illustrating another embodiment of the invention, in which portions identical with those shown in FIG. 12 are designated by like reference characters. Numerals 239a, 239b denote lenses.

In this embodiment, the separate lenses 239a, 239b are provided rather than the single lens of FIG. 12. The effects are the same as in FIG. 12, except in this case the sensors are further apart then in FIG. 12 so that the partitioning plate is unnecessary. Slit width, sensor width and the positions at which these are disposed have values the same as those calculated in accordance with FIG. 12.

Figure 14:
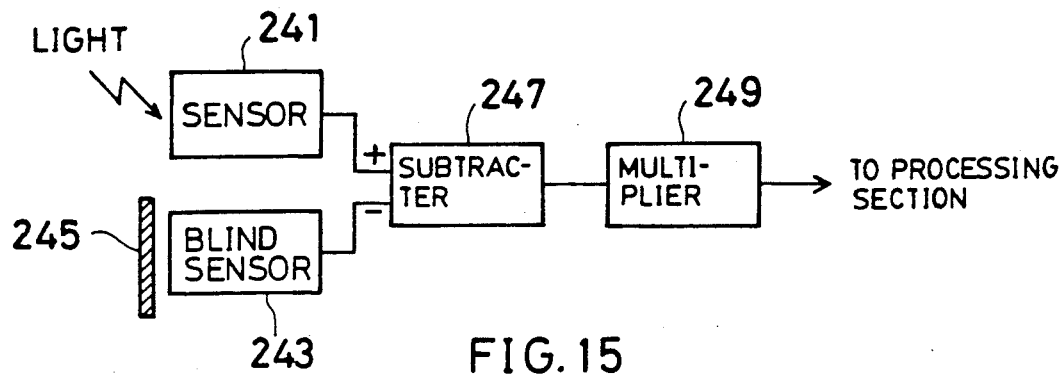
FIGS. 14 and 15 are views showing another embodiment adapted to improve S/N ratio.
Figure 15:
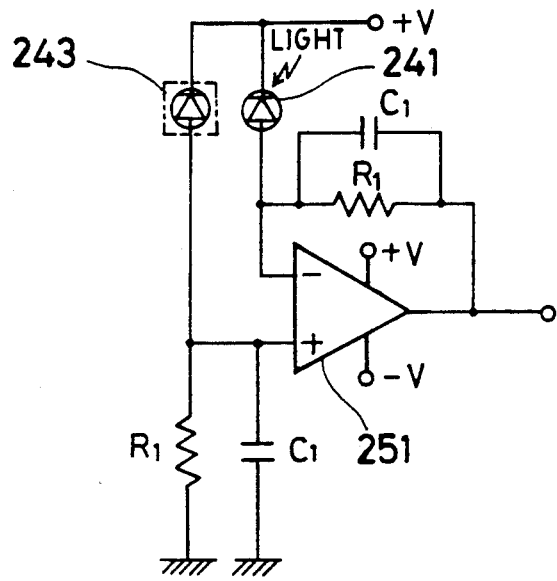

FIGS. 14 and 15 are views illustrating another embodiment adapted to improve S/N ratio. The arrangement includes sensors 241, 243, a blinder 245, a subtracter 247, and an amplifier 249.

In this embodiment, the blinder 245 is arranged to prevent light from entering the sensor 243 of the pair, and the effects of noise such as caused by electromagnetic waves are removed by using the subtracter 247 to compute the difference between the sensor outputs. Thus, the sensor 241 is for sensing the road surface and the sensor 243 is adapted to compensate for noise. If these two sensors are formed as sensors on a single chip, as shown in FIG. 15, sensing accuracy can be improved.

Figure 16:
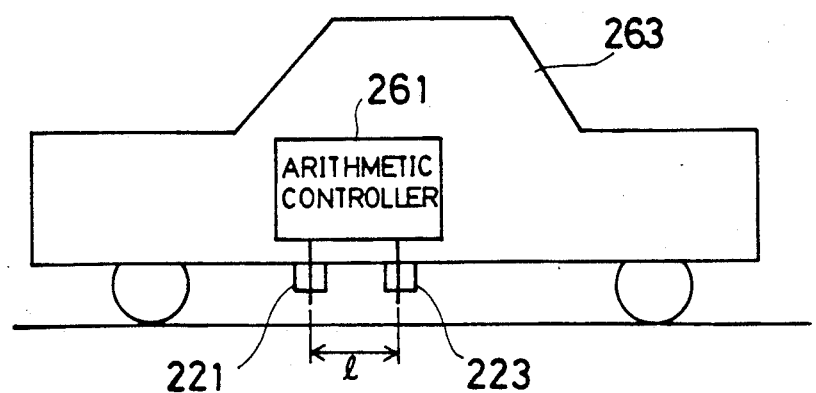
FIG. 16 is a view illustrating the detecting apparatus of the invention mounted on a vehicle body.

FIG. 16 is a view illustrating, in schematic form, an example in which sensors of the type shown in FIGS. 12 and 13 are mounted on the chassis of a vehicle body 263, the sensor outputs are read by an arithmetic controller 261, which proceeds to compute a correlation function and calculate vehicle velocity to control a 4-wheel drive unit, an anti-skid unit or a 4-wheel steering control unit, etc.

When the sensors shown in FIGS. 12, 13a and 13b used, it can be arranged so that spot shape and size and the distance between the sensors will not change even if measurement distance, namely the lens-to-road surface distance, is caused to change by bouncing of the vehicle body or irregularities in the road surface. As a result, measurement errors are prevented from occurring and the amount of received light can be increased, the latter making it possible to detect velocity at a high S/N ratio, even if with a small-size light source.

Figure 17:
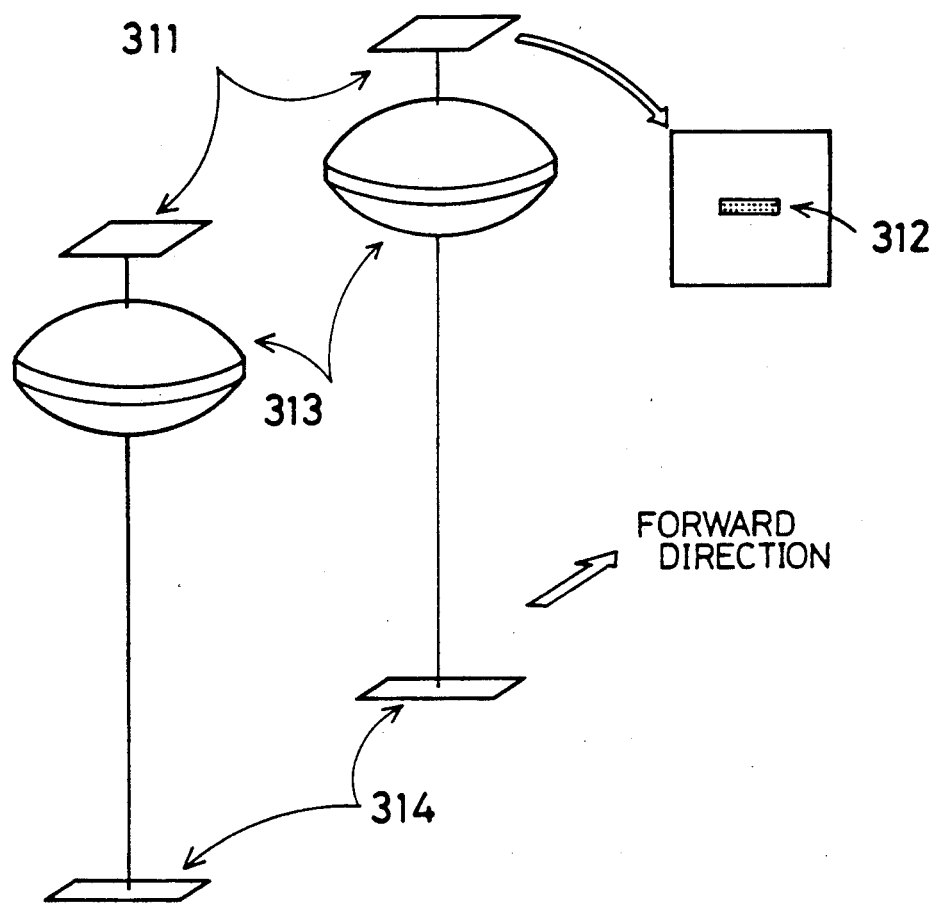
FIG. 17 is a view showing another embodiment of the invention using oblong sensors.

FIG. 17 is a view showing another embodiment using oblong sensors. Numeral 311 denotes sensors, 312 a light-receiving surface, 313 lenses and 314 spots on a measurement surface.

As shown in FIG. 17, the light-receiving surface 312 of each sensor 311 has an oblong configuration which is narrow in the forward direction of travel and long in a direction at right angles to the forward direction. If each lens 311 is placed at the position where the measurement surface is imaged by the corresponding lens 313, the spot 314 that provides the detection field of view will be oblong in shape, so that the corresponding sensor 313 will output a signal having high-frequency components. Consequently, sampling timing is shortened to enable an improvement in detection accuracy. Furthermore, even if the front and rear sensors develop transverse displacement, the portion of the measurement surface not overlapped by the spots of both sensors will be small in terms of proportion, as a result of which correlativity is enhanced. Moreover, since the areas of the spots on the measurement surface can be enlarged, the system can be made less susceptible to the influence of external disturbances caused by the motion of snowflakes, water droplets and the like.

A problem that arises in the present embodiment is that the measurement spot becomes blurred and changes shape when there is a fluctuation in the measurement distance. An embodiment which improves upon this will now be described with reference to FIG. 18.

Figure 18:
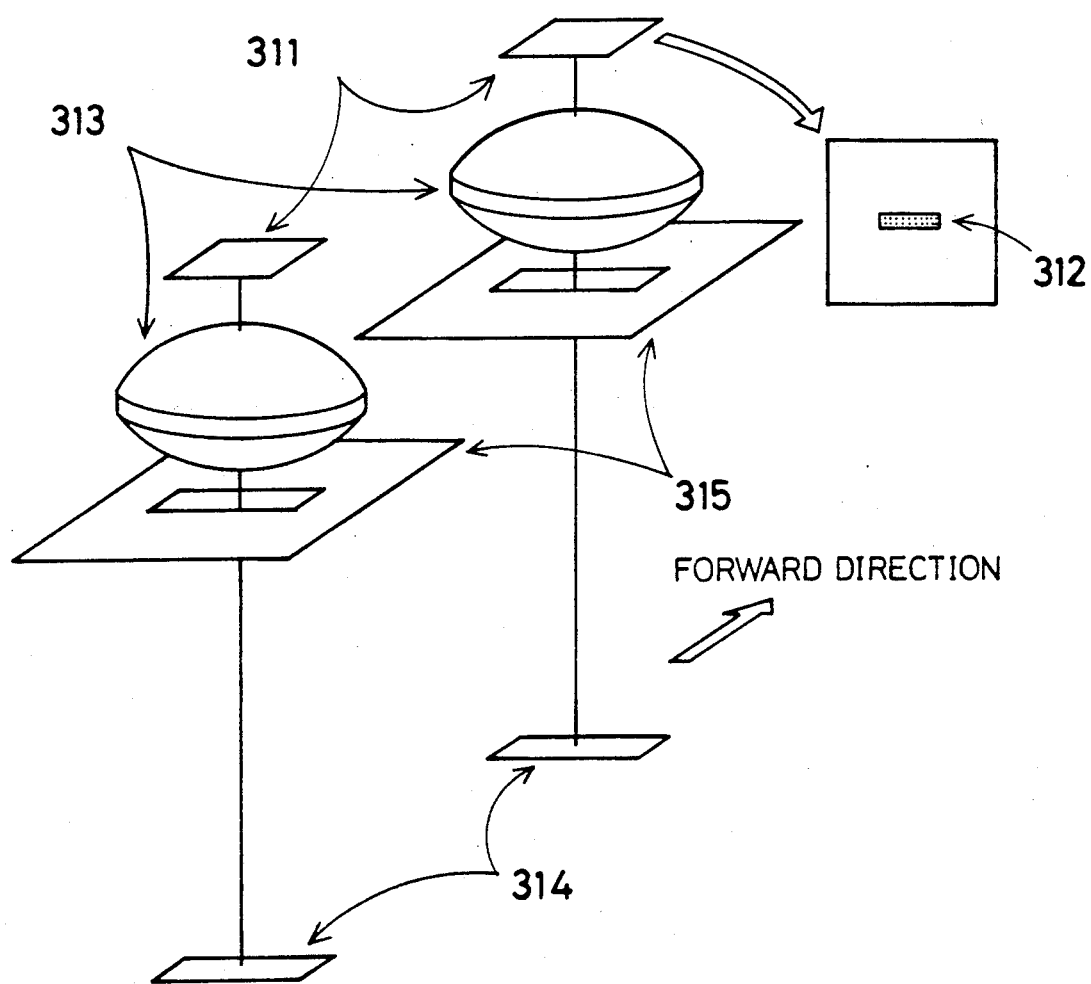
FIG. 18 shows yet another embodiment in which diaphragms are placed on the front sides of lenses, wherein the sensors of FIG. 17 are employed.

FIG. 18 shows yet another embodiment in which diaphragms 315 are placed on the front sides of lenses, wherein the sensors of FIG. 17 are employed.

More specifically, each diaphragm arranged in front of the corresponding lens 313 forms the light-receiving area of the lens into an oblong shape, whereby the spot on the measured surface due to the sensor 311 becomes oblong in shape.

Figure 19A:
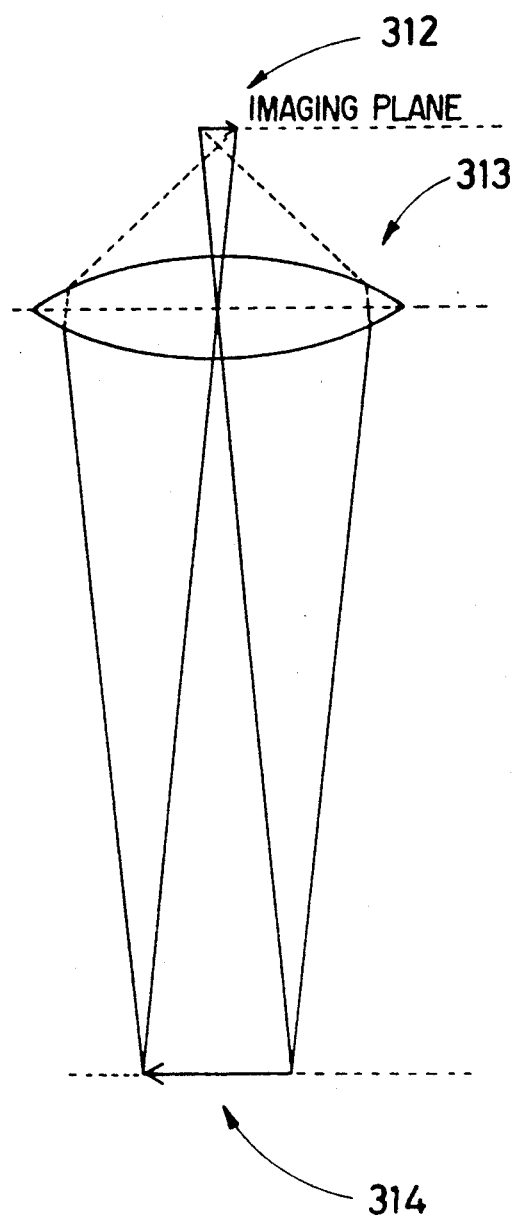
FIGS. 19(a) and 19(b) are views depicting optical systems when a diaphragm is and is not provided, respectively.

The difference in actions and effects between an optical system not using the diaphragm [FIG. 19(a)] and an optical system having the diaphragm [FIG. 19(b)] will now be described.

Assume that the sensors shown in FIG. 17 are placed at the lens imaging positions, where L represents the distance from the lenses 313 to their spots 314 on the measured surface. When the measurement distance fluctuates, the shape of the spot 314 in FIG. 19(a) becomes blurred due to a change in the imaging position. In FIG. 19(b), on the other hand, the fact that the diaphragm 315 is provided enlarges the depth of the focal point and makes it possible to avoid blurring of the spot and maintain the spot 314 in the oblong shape decided by the diaphragm 315, even when the measurement distance becomes less than L. It should be noted that the spot will become blurred even in the case of FIG. 19(b) if the measurement distance exceeds L. Therefore, if the position of the spot on the measured surface is set to lie at an intermediate position along the measurement distance L, the shape of the spot will not change even if the measurement distance varies somewhat due to up-and-down motion of the vehicle body.

Figure 19B:
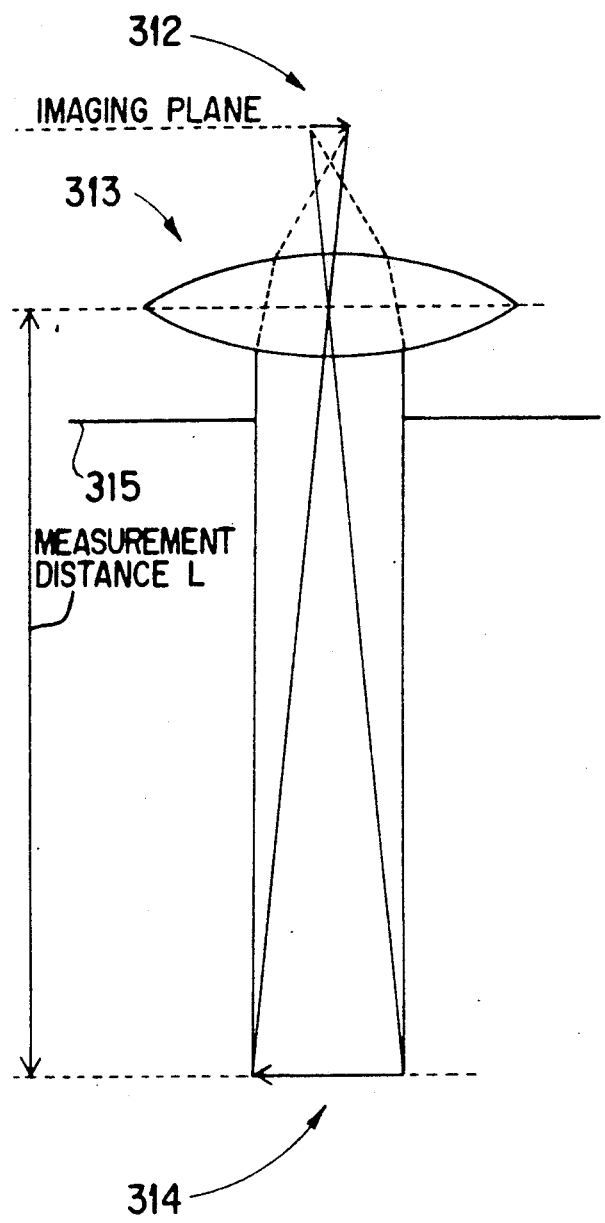

With the arrangement of FIG. 19(b), the light-transmitting region is limited by the diaphragm 315. Therefore, if the region of the lens that does not transmit light is cut away, the diaphragm 315 can be omitted to obtain the same effect. An example of this will now be described with reference to FIGS. 20 and 21.

Figure 20:
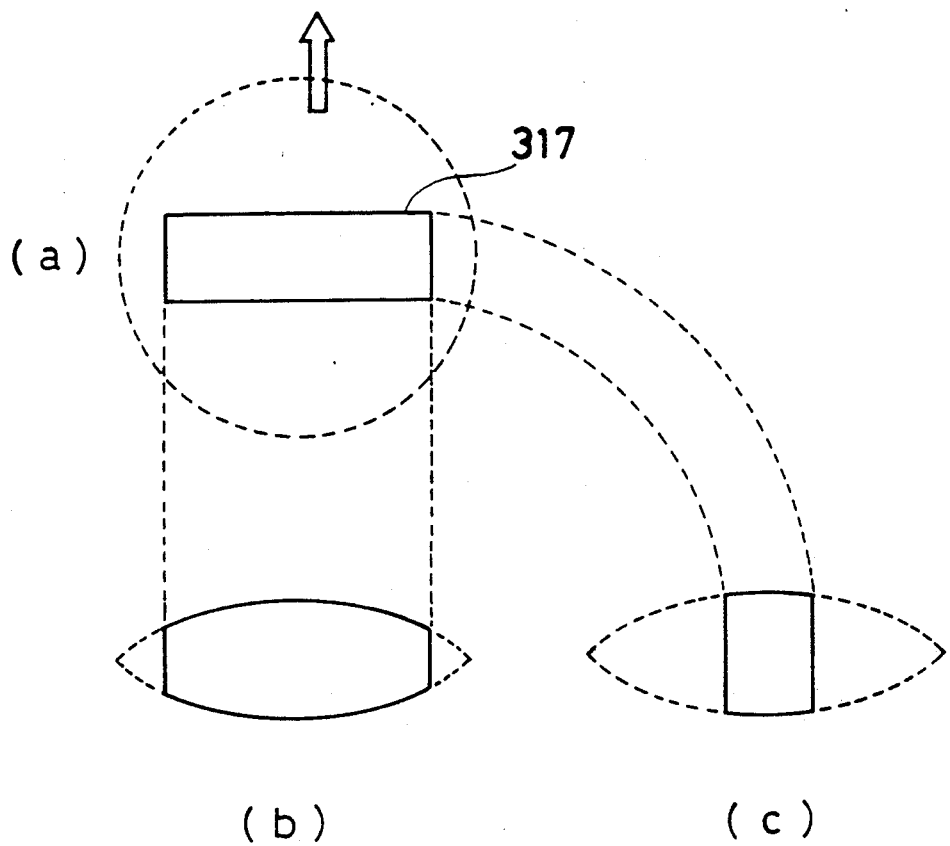
FIGS. 20(a) to (c) is a view showing a lens cut leaving only a light-transmitting area.
Figure 21:
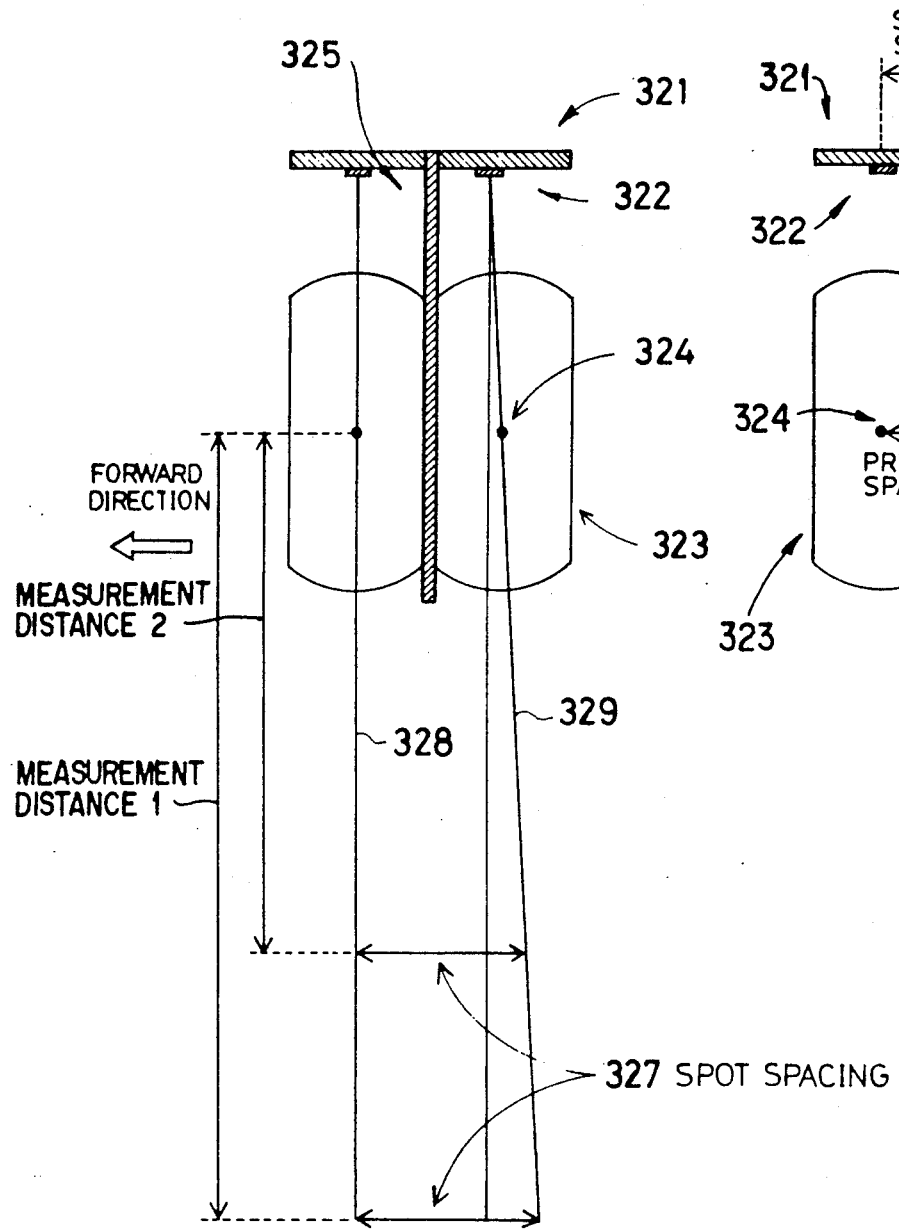
FIGS. 21(a) and 21(b) are views illustrating a further embodiment of the invention, in which lenses comprise solely limited light-transmitting areas.

FIG. 20 is a view illustrating a lens cut leaving only a limited light-transmitting area. FIG. 20(a) is a plan view and (b) and (c) are side views, and FIG. 21 is a view showing another embodiment of the invention using the lens of FIG. 20. In FIGS. 20 and 21, numeral 317 denotes the lens, 321 a sensor substrate, 322 a sensor light-receiving surface, and 323 a lens having a principal point 324. Numerals 325, 326 denote light-shielding plates, and 327 spot spacing on a measured surface.

In FIG. 21(a), the lens is cut in such a manner that the lens light-transmitting region becomes oblong in shape in the forward travelling direction, as shown in FIG. 20, and the lenses 323 are affixed to the two sides of the light-shielding plate 325. The two sensors are formed on the same printed circuit board or on the same chip by an IC technique in such a manner that the two sensors have the same spacing as the lenses. The light-shielding plate 325 is provided in order to prevent the light from one lens from entering the other lens owing to the close proximity of the lenses.

In the example of FIG. 21(a), the lenses are cut so as to limit the light-transmitting portions thereof, thereby obtaining an effect equivalent to that of the embodiment of FIG. 18 using the diaphragms. Furthermore, in the present embodiment, the lenses are arranged close to each other and are formed to have small widths, as a result of which sensor spacing can also be made small. The smaller sensor spacing is thus made, the higher the correlativity of the waveforms from the front and rear sensors. At the same time, the sampling time can be shortened to enable highly accurate measurement even at low velocities. Moreover, if lens focal length is reduced, the apparatus can be made more compact and the focused image is reduced in size. The latter is advantageous in that a smaller light-receiving surface will suffice for obtaining the same amount of light, thereby enabling the S/N ratio to be improved in relative terms.

It should be noted that if the distance between the lenses is made very small, such as on the order of 3 mm, it will be very difficult to achieve coincidence between lens spacing and sensor spacing. If such coincidence is not achieved, the optical axes 328, 329 of the two lenses in FIG. 21(a) will no longer be parallel, with the result that spot spacing on the measured surface at measurement distance 1 will differ from that at measurement distance 2, as shown in FIG. 21(a). Though this error will not be particularly relevant when the distance between the lenses and the sensors is great, it will have a major effect if the focal length is reduced for the sake of compactness. Since the two lenses are formed separately of each other in the embodiment of FIG. 21(a), it is difficult to achieve a highly precise parallel relationship between the two optic axes.

FIG. 21(b) shows an example in which two lenses are integrally molded into a whole by a mold to raise spacing accuracy and achieve a more parallel relationship between the optical paths.

Since the two lenses are molded together in FIG. 21(b), a light-shielding plate 326 having a predetermined thickness t is arranged between the sensor substrate and the lenses in order to prevent the light from one lens from penetrating the other. In this embodiment, the two lenses are molded into a whole and the sensors are formed on the same printed circuit board or on the same chip by using IC techniques. This makes it possible to achieve a measurement accuracy on the micron order and to achieve a parallel relationship between the optic axes that is highly accurate.

By adopting the arrangements of FIGS. 17, 18 and 19, a decline in correlativity due to any transverse displacement of the front and rear sensors can be prevented, and spot area can be enlarged without the sensor being susceptible to external disturbances. In addition, a signal containing many high-frequency components can be obtained to improve measurement accuracy and shorten sampling time. Moreover, the spot can be maintained in the oblong shape since it will not become blurred even if measurement distance changes. Further, by cutting the lenses so that they will comprise oblong light-transmitting regions, fixing the lenses close together or molding them into a whole, and forming the two sensors on the same substrate or the same chip, coincidence can be achieved between sensor spacing and the principal point spacing of the lenses and sensor spacing can be reduced to further improve the correlativity of the output waveforms from the front and rear sensors. It also becomes possible to perform highly accurate measurement, even in the low-velocity region, at a short sampling time. A further reduction in the size of the apparatus also becomes possible.

Figure 22:
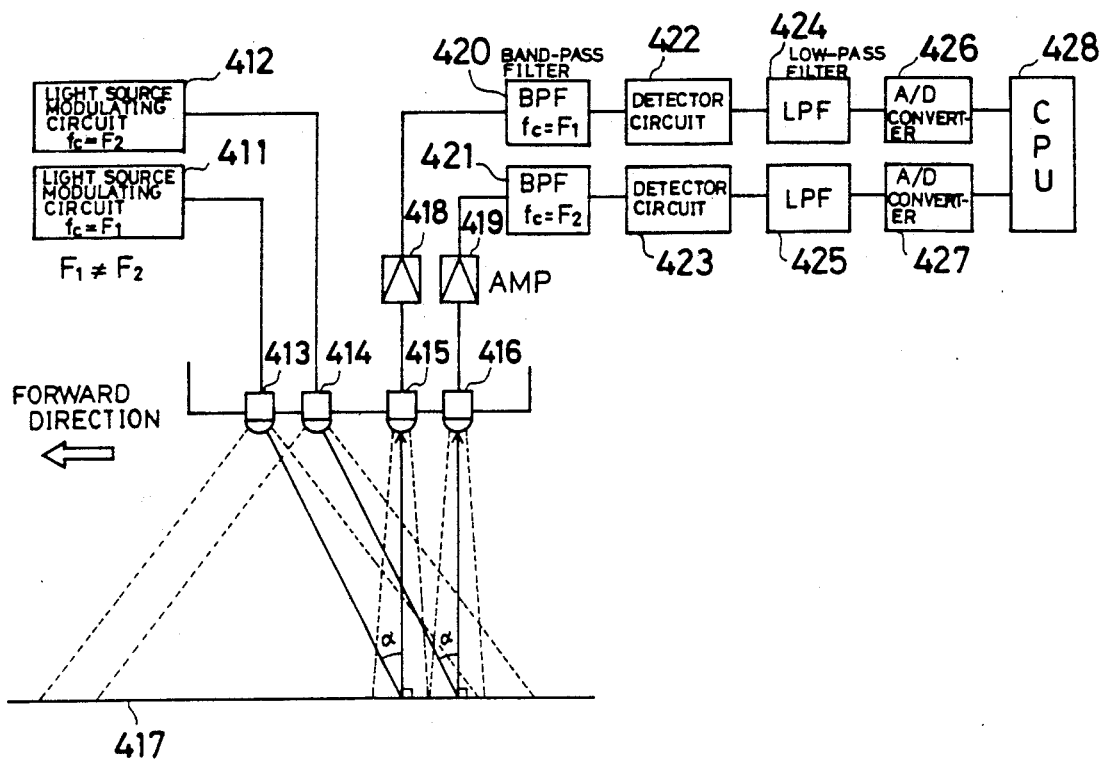
FIG. 22 is a view showing a further embodiment of an optical correlation-type speedometer using modulated light in accordance with the invention.
Figure 23:
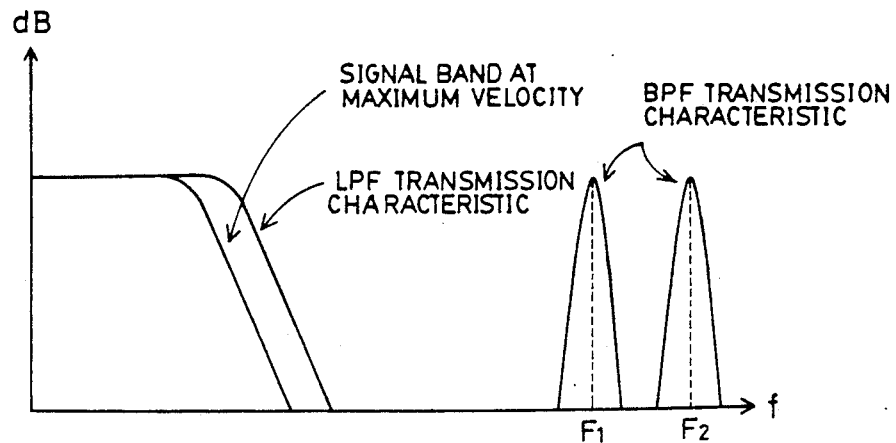
FIG. 23 is a view showing filter characteristics.

FIG. 22 is a view illustrating another embodiment of an optical correlation-type speedometer using modulated light, and FIG. 23 is a view showing filter characteristics. Shown in FIG. 22 are light source modulating circuits 411, 412, light-emitting elements 413, 414, light-receiving elements 415, 416, a measured surface 417, amplifiers 418, 419, band-pass filters 420, 421, detector circuits 422, 423, low-pass filters 424, 425, A/D converter 426, 427, and a CPU 428.

As shown in FIG. 22, the arrangement is such that the relative positional relationship between the light-emitting element 413 and light-receiving element 415 is the same as that between the light-emitting element 414 and light-receiving element 416. The light-emitting elements 413, 414 are driven so as to flash at different frequencies $F_1$, $F_2$ by the modulating circuits 411, 412, respectively. Since these two sets of light-emitting and light-receiving elements have the same relative positional relationships, light reflected at the same reflecting position can be detected by both light-receiving elements 415, 416 even if the measured surface 417 is a mirror-like surface caused by water droplets or a water film. Thus, reflected light originating from the two light sources is sensed by the two light-receiving elements 415, 416, which respond by producing output signals amplified by the amplifiers 418, 419, respectively. The center frequencies of the two signals, shown at $F_1$ and $F_2$ in FIG. 23, are passed by the band-pass filters 420, 422 having different pass bands. As a result, an interfering light component from one light source is cut, so that only the reflected light components from respective ones of the corresponding light sources are extracted. The modulated components of reflected light from the measured surface 417 are extracted by the detector circuits 422, 423, and high-pass components are removed by passing the signals through the low-pass filters 424, 425 having a pass band width greater than that of the maximum velocity signal band shown in FIG. 23. The resulting signals are subjected to an A/D conversion by A/D converters 426, 427, after which the correlation is determined by processing executed by the CPU 428. It is necessary that the modulating frequencies of the light sources 411, 412 be set to frequencies that are sufficiently higher than the signal band due to unevenness in the measured surface 417.

In accordance with this embodiment, band-pass filters are used to extract the reflected light components from the corresponding light sources. However, it is possible to adopt an arrangement in which the sensor outputs are synchronously detected by signals from the light source modulating circuits to sense only the corresponding reflected light components.

Thus, with the embodiment of FIG. 22, signals at the same reflection position can be sensed by the front and rear sensors even if the measured surface is covered with water droplets or the like. This makes it possible to measure velocity. Also, since the distance between the two sensors can be shortened, even low velocities can be measured at a short sampling time, the influence of transverse displacement can be diminished and it is possible to perform highly precise measurement and to reduce the size of the overall sensor unit. Moreover, the use of modulated light makes it possible to eliminate the effects of outside disturbances such as external light.

Described next will be a system for measuring coefficient of friction and velocity using various sensors of the kind mentioned above.

Figure 24:
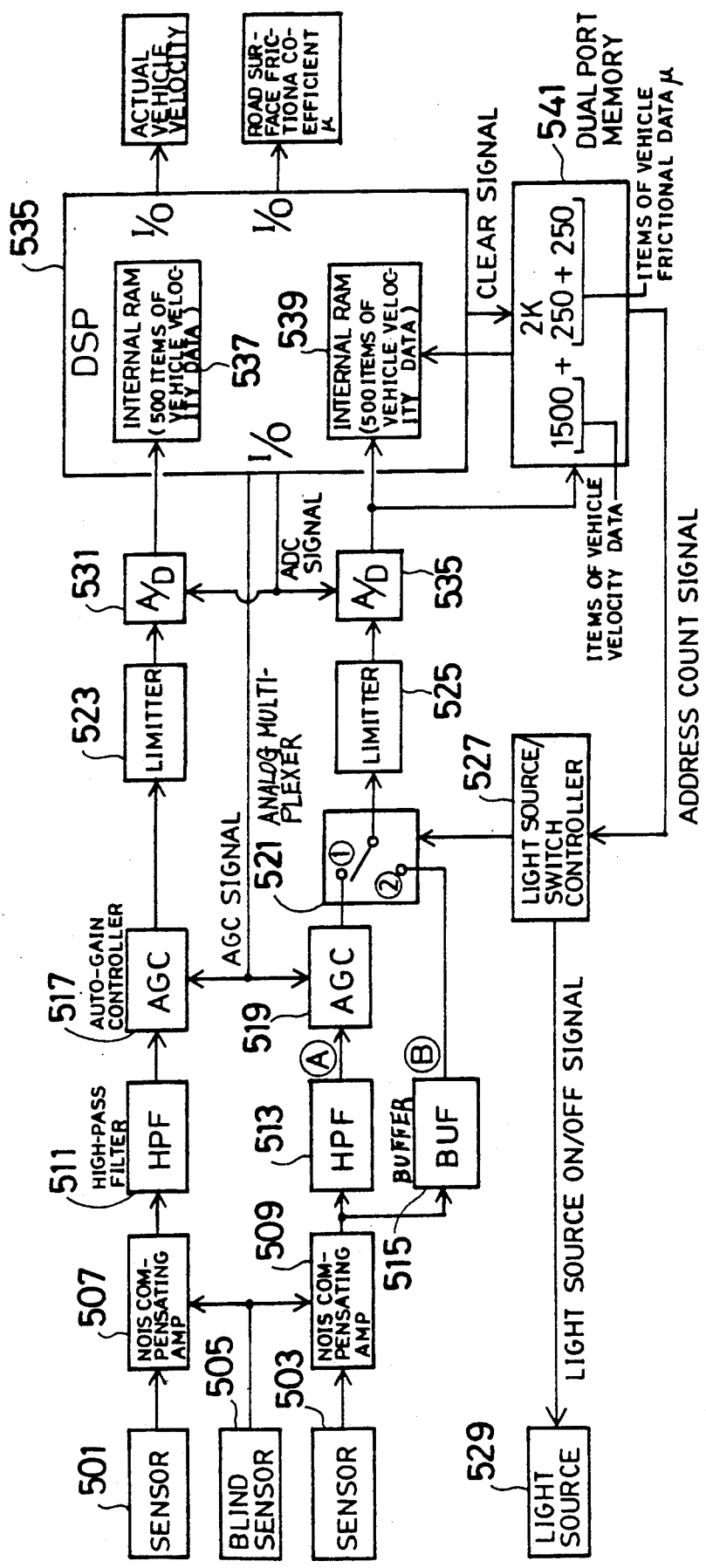
FIG. 24 is a block diagram illustrating the construction of a correlation-type speedometer that is also used for measuring coefficient of friction in accordance with the invention.
Figure 25:
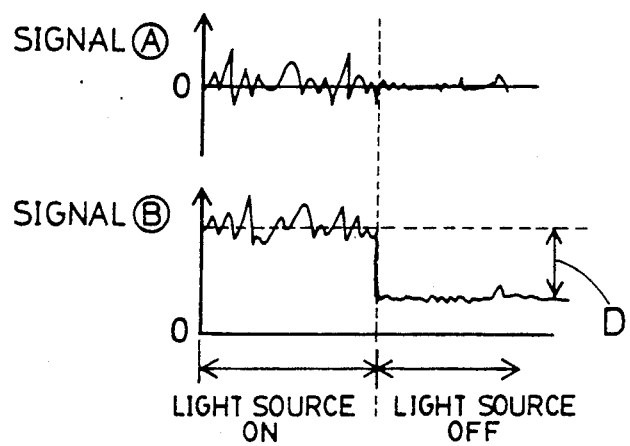
FIG. 25 is a waveform diagram.
Figure 26:
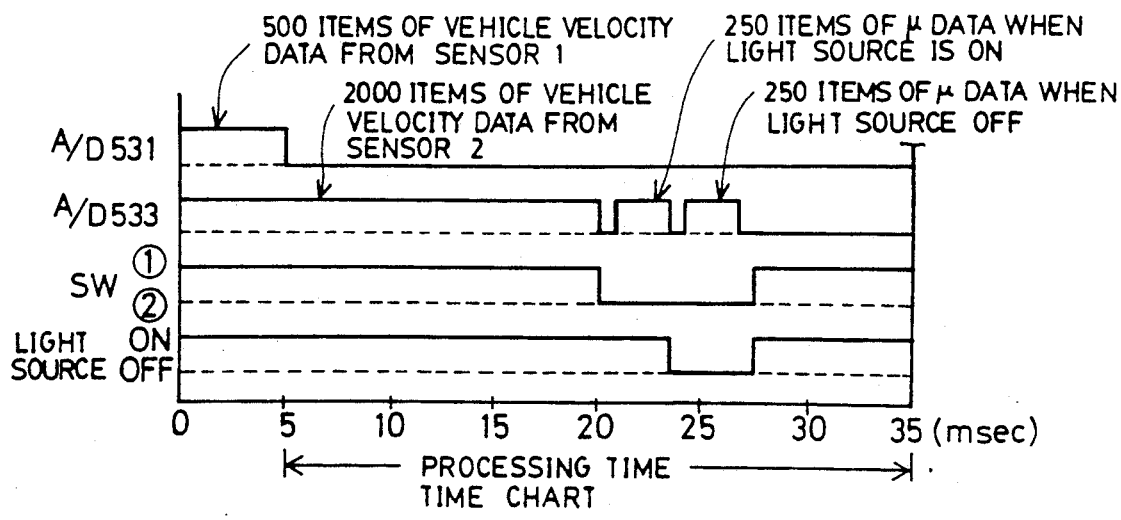
FIG. 26 is a timing chart.

FIG. 24 is a block diagram illustrating the construction of a correlation-type speedometer that is also used for measuring coefficient of friction in accordance with the invention, FIG. 25 is a waveform diagram of signals associated with the system of FIG. 24, and FIG. 26 is a timing chart associated with the system of FIG. 24. Shown in FIG. 24 are sensors 501, 503, a blind sensor 505, noise compensating amplifiers 507, 509, high-pass filters 511, 513, a buffer 515, auto-gain controllers (AGC's) 517, 519, an analog multiplexer 521, limiters 523, 525, a light source/switch controller 527, a light source 529, A/D converters 531, 533, a digital signal processor (DSP) 535, internal RAM's 537, 539, and a dual-port memory 541.

As shown in FIG. 24, output signals from the sensors 501, 503 are applied to respective ones of the noise compensating amplifiers 507, 509, which also receive the output of the blind sensor 505 to compute the difference between the blind sensor output and the other two sensor outputs and amplify the respective differences. The blind sensor 505 is shielded from light, so that the influence of electromagnetic waves and the like can be removed by the subtraction processing. The noise-compensated signals outputted by the amplifiers 507, 509 have their high-frequency components extracted by the high-pass filters 511, 513, respectively. This is done in order to allow omission of a correction computation $(-A, -B)$ for an offset due to DC components, and to enable the sampling time to be shortened. The outputs of the high-pass filters 511, 13 are applied to the AGC's 517, 519, and the output of the AGC 517 has its waveform shaped via a limiter 23. The output of the AGC 519 is applied to the analog multiplexer 521. The other input to the analog multiplexer 521 is the output of the buffer amplifier 515, the input to which is the output of the noise-compensating amplifier 509. The output of the AGC 519 is transmitted when the multiplexer 521 is set to a terminal ①, and the output of the buffer 515 when the multiplexer 521 is set to a terminal ②. The output of the analog multiplexer 521 is fed into a limiter 525. The outputs of the limiters 523, 525 are subjected to an analog/digital conversion by the A/D converters 531, 533 before being read in by the DSP 535. The output of the A/D converter 533 is applied to the dual-port memory 541, which is for accepting vehicle velocity data and data indicative of the frictional coefficient $\mu$ of the road surface.

In accordance with this embodiment, use is made of 500 items of data from the sensor 501 and 2000 items of data from the sensor 503. Since the internal RAM's for the DSP 535 each have enough capacity for only 500 items of data, the dual-port memory 541 is used to accept 150 items of vehicle velocity data and 500 items of frictional coefficient data. The dual-port memory 541 can be accessed by both the A/D converter 533 and the DSP 535. Therefore, when sampling of vehicle velocity data ends, the dual-port memory 541 outputs an address count signal to drive the light source/switch controller 527, whereby the analog multiplexer 521 is changed over to turn the light source 529 on and off. The DSP 535 calculates a correlation function from the accepted vehicle velocity data, determines the stagger time for which the correlation value is maximized and then calculates the actual velocity of the vehicle. The DSP 535 also calculates the reflection factor from the road surface frictional coefficient data, and reads a road surface frictional coefficent $\mu$ from an already prepared reflection factor—frictional coefficient conversion table. On the basis of these outputs of actual velocity and frictional coefficient $\mu$, 4-wheel drive control and braking control are carried out.

The operation of the system shown in FIG. 24 will be described in greater detail with reference to FIGS. 25 and 26.

Initially, the analog multiplexer 521 is set to the ① side and the light source 529 is on. The difference between the output of the blind sensor 505 and each of the outputs of the sensors 501, 503 is found in order to compensate for noise. The resulting signals are processed via the band-pass filters 511, 513, AGC's 517, 519, contact ① of the analog multiplexer 521, limiters 523, 525, and A/D converters 531, 533, and the results from the A/D converters 531, 533 are stored in the internal RAM's 537, 539 of the DSP 535 and the dual-port memory 541. Since each of the internal RAM's have capacity sufficient for only 500 items of data, the DSP 535 issues a clear signal at the moment 500 items of data are accepted, thereby clearing the dual-port member 541, after which the data from the sensor 503 is accepted by the dual-port memory 541. When the amount of data accepted by dual-port memory 541 reaches 1500 items, the memory 541 produces the address count signal to drive the light source/switch controller 527, whereby the contact of the analog multiplexer 521 is switched over to contact ②. From this time onward the output of buffer 515 is inputted to the dual-port memory 541. Then, upon accepting 250 items of data, the dual-port memory 541 outputs the address count signal, the light source 529 is turned off and another 250 items of data is accepted by the memory. Meanwhile, the DSP 535 concurrently computes the correlation function and calculates the actual velocity, after which it computes the coefficient of friction of the road surface. As shown in FIG. 25, the coefficient of friction is determined by finding the difference D between the signal level when the light source 529 is on and the signal level when the light source is off, and the reflection factor is measured under conditions free of the influence of external light. The coefficient of friction of the road surface and the reflection factor are mutually related. When the reflection factor is large, as would be the case if the road surface were covered with snow or moist with water, then the coefficient of friction is small. This relationship between the coefficient of friction of the road surface and the reflection factor is measured in advance and the results are stored in the form of a table. Then, when a reflection factor is measured, the coefficient of friction corresponding thereto is read from the table and delivered as an output signal. In order to avoid erroneous determinations as when a white line painted on the road surface is sensed and judged incorrectly to be snow, the measurement of reflection factor is performed several times and then either abnormal values are discarded or an average value computed over several cycles is adopted as the measured value.

In a case where the coefficient of friction is actually used for controlling a vehicle, friction is detected and classified as being high or low and this is used as a criterion for determining whether a surface is snow- or water-covered, asphalt or gravel, etc., with the vehicle being controlled accordingly.

In the embodiment described above, the dual-port memory is used besides the DSP. However, it goes without saying that the dual-port memory can be dispensed with if the DSP has an internal memory of large capacity.

In accordance with the system of FIG. 24, the sensors and processor are used both for detecting velocity and for detecting coefficient of friction. This makes it possible to reduce the size and cost of the apparatus.

As many apparently widely different embodiments of the present invention can be made without departing from the spirit and scope thereof, it is to be understood that the invention is not limited to the specific embodiments thereof except as defined in the appended claims.

What we claim is:

1. In a correlation-type speedometer having two sets of light sources and sensors arranged one in front of the other in a direction of movement for calculating velocity by computing a correlation function of sensor output signals from the sensors which receive reflected light from a moving object, and determining a stagger time for which a correlation function value is maximized, an optical correlation-type velocity measurement apparatus characterized in that said two sets of light sources and sensors are arranged so as to have relative positional relationships with respect to a measured surface that are the same, and in that there are provided means for flashing the light sources at periods that differ from each other, and signal extracting means for extracting, from the sensor outputs, signal components having the same periods as the flashing periods of the corresponding light sources.

2. The optical correlation-type velocity measurement apparatus according to claim 1, wherein the moving object is a road surface and the sensors are mounted on an automotive vehicle.

3. The optical correlation-type velocity measurement apparatus according to claim 1, wherein said signal extracting means is a band-pass filter.

4. The optical correlation-type velocity measurement apparatus according to claim 1, wherein said signal extracting means is a synchronous detecting means.

5. An optical correlation-type velocity measurement apparatus comprising:
processing means to which is inputted detection signals from two sensors arranged one in front of the other in a direction of movement;
a light source for irradiating a road surface with light; and
means controlled by the processing means for turning the light source on and off;
said processing means computing a correlation function of the detection outputs of the two sensors and determining velocity from a stagger time for which a correlation function value is maximized, and determining a coefficient of friction of the road surface from a difference between the detection outputs of said sensors when said light source is turned on and off.

6. An optical correlation-type velocity measurement apparatus according to claim 5, further comprising high-pass filters arranged between said sensors and said processing means for passing said sensor detection signals therethrough.

7. An optical correlation-type velocity measurement apparatus according to claim 5, wherein measurement of the correlation function value and measurement of the coefficient of friction are performed on a time-sharing basis.

8. An optical correlation-type velocity measurement apparatus for calculating velocity by computing a correlation function of detection output signals from two sensors which sense reflected light from a road surface after the light passes through respective ones of two lenses arranged one in front of the other in a direction of movement on an automobile, and determining a stagger time for which a correlation function value is maximized, said apparatus comprising measurement spot forming means for forming a measurement spot having an oblong shape that is narrow in a forward direction of movement and long in a direction at right angles to the forward direction,
wherein an output differential between each of said sensors and a blind sensor is used as a detection output.

9. An optical correlation-type velocity measurement apparatus for calculating velocity by computing a correlation function of detection output signals from two sensors which sense reflected light from a moving object after the light passes through respective ones of two lenses arranged one in front of the other in a direction of movement, and determining a stagger time for which a correlation function value is maximized, said apparatus comprising measurement spot forming means for forming a measurement spot having an oblong shape that is narrow in a forward direction of movement and long in a direction at right angles to the forward direction and including a light-receiving surface on said sensors, said light receiving surface being narrow in the forward direction of movement and long in the direction at right angles to the forward direction.

10. The optical correlation-type velocity measurement apparatus according to claim 9, wherein said measurement spot forming means includes a diaphragm provided in front of each of said lenses having an aperture that is narrow in the forward direction of movement and long in the direction at right angles to the forward direction.

11. The optical correlation-type velocity measurement apparatus according to claim 9, wherein said two lenses are cut away leaving a light-transmitting area having a light-receiving surface that is narrow in the forward direction of movement and long in the direction at right angles to the forward direction.

12. The optical correlation-type velocity measurement apparatus according to claim 11, wherein said two sensors are formed on the same substrate, said two lenses are integrally molded and a light-shielding plate is provided between said sensors and said lenses.

* * * * *